US012307873B2

(12) United States Patent
Johanns et al.

(10) Patent No.: US 12,307,873 B2
(45) Date of Patent: May 20, 2025

(54) THREAT DATA ANALYZER

(71) Applicants: Keith J. Johanns, Dublin, OH (US); Nicolas P. Bons, Ogden, UT (US); Patrick A. Green, Glenwood, MD (US); Patrick Alan Loney, Fairview Park, OH (US)

(72) Inventors: Keith J. Johanns, Dublin, OH (US); Nicolas P. Bons, Ogden, UT (US); Patrick A. Green, Glenwood, MD (US); Patrick Alan Loney, Fairview Park, OH (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 42 days.

(21) Appl. No.: 17/980,916

(22) Filed: Nov. 4, 2022

(65) Prior Publication Data

US 2024/0153370 A1 May 9, 2024

(51) Int. Cl.
*G08B 17/10* (2006.01)
*G08B 21/12* (2006.01)

(52) U.S. Cl.
CPC .................................... *G08B 21/12* (2013.01)

(58) Field of Classification Search
CPC ...................................................... G08B 21/12
See application file for complete search history.

(56) References Cited

U.S. PATENT DOCUMENTS 4,752,226 A * 6/1988 Akers ...................... F41H 9/00 434/11
5,694,129 A * 12/1997 Fujinawa ................. G01V 1/01 340/690
6,023,223 A * 2/2000 Baxter, Jr. ............. G06Q 10/06 340/539.18
6,084,510 A * 7/2000 Lemelson .............. G08G 1/164 382/104
6,100,806 A * 8/2000 Gaukel .............. G08B 21/0211 340/8.1
6,155,160 A * 12/2000 Hochbrueckner .......................... G05D 23/1917 250/339.04
6,360,031 B1 * 3/2002 Harrah ............... G02B 6/02033 385/38
6,395,558 B1 * 5/2002 Duveneck .......... G01N 21/7743 422/82.11

(Continued)

FOREIGN PATENT DOCUMENTS

WO 2005-017659 A2 2/2005

OTHER PUBLICATIONS

International Search Report & Written Opinion (WOISR) for corresponding PCT/US2023/073646, mailed Jan. 10, 2024.

*Primary Examiner* — Quang Pham
(74) *Attorney, Agent, or Firm* — Tarolli, Sundheim, Covell & Tummino LLP

(57) ABSTRACT

A threat analyzer receives threat data measured by detectors. The threat data characterizes a status of detected emissions for a corresponding detector. The threat analyzer analyzes the threat data to identify a geographic region that contains a threat to humans and stores the threat data and analyzed data in a database. The machine readable instructions also include a graphical user interface (GUI) generator that provides an interactive map with indicia that characterizes the analyzed threat data.

12 Claims, 10 Drawing Sheets

(56) References Cited

U.S. PATENT DOCUMENTS 6,490,530 B1 * 12/2002 Wyatt ................ G01N 15/1459 702/26
6,720,866 B1 * 4/2004 Sorrells .............. G06K 19/0723 340/10.41
6,728,552 B2 * 4/2004 Chatain .................... G01C 5/06 455/418
7,116,235 B2 * 10/2006 Alioto ...................... G01V 5/26 378/57
7,308,374 B2 * 12/2007 Gleason ............. G05B 23/0213 702/45
7,552,017 B1 * 6/2009 Baker ..................... G01T 1/171 250/252.1
8,779,921 B1 * 7/2014 Curtiss ................. G08B 25/009 340/541
8,854,218 B1 * 10/2014 Reagan ............... H04L 41/0631 340/539.22
9,412,141 B2 * 8/2016 Prichard ............ G06Q 30/0204
9,497,585 B1 * 11/2016 Cooley ................. H04W 4/029
9,518,941 B1 * 12/2016 Lingren ............... G01N 23/222
9,600,805 B2 * 3/2017 Lange .................... G06Q 10/10
9,697,710 B2 * 7/2017 Kuznetsov ............. G08B 21/02
9,819,911 B2 11/2017 K V et al.
9,973,892 B1 * 5/2018 Parshin ................. H04W 68/06
9,980,137 B2 * 5/2018 South ...................... H04W 4/02
10,104,605 B1 * 10/2018 Parshin ................. H04W 36/13
10,403,115 B2 * 9/2019 Hwang ................ G01C 21/362
10,607,467 B2 * 3/2020 Kanukurthy ........... A62B 18/08
10,757,531 B1 * 8/2020 Parshin ................. H04W 16/18
10,791,656 B1 * 9/2020 Birnbach ............. H05K 9/0088
10,885,759 B1 * 1/2021 Lee .................... G08B 21/0446
10,959,056 B1 * 3/2021 Alsahlawi .............. G06Q 50/08
10,984,644 B1 * 4/2021 Alsahlawi .............. G08B 25/10
11,030,873 B2 * 6/2021 Kanukurthy ....... G08B 21/0275
11,051,706 B1 * 7/2021 Nadeau ................. A61B 5/1118
11,172,339 B1 * 11/2021 Hummer ................. H04W 4/38
11,410,519 B2 * 8/2022 Hasan .................. G08B 29/188
11,933,453 B2 * 3/2024 Swift ...................... F16P 3/142
2002/0070869 A1 * 6/2002 Dungan ............. G01N 33/0073 340/506
2002/0143469 A1 * 10/2002 Alexander ............. A62B 99/00 702/2
2003/0069002 A1 * 4/2003 Hunter ................... G08B 21/12 455/567
2003/0093484 A1 * 5/2003 Petite ................... H04B 1/3827 709/224
2003/0201900 A1 * 10/2003 Bachinski .............. G08B 21/14 340/632
2004/0015336 A1 * 1/2004 Kulesz ................. H04M 11/002 436/100
2004/0119591 A1 * 6/2004 Peeters ................ G08B 25/006 977/957
2004/0257227 A1 * 12/2004 Berry ........................ G21J 5/00 703/11
2005/0001720 A1 * 1/2005 Mason .................... G01S 19/17 340/539.2
2007/0044539 A1 * 3/2007 Sabol ..................... G06Q 10/06 73/19.01
2007/0090942 A1 * 4/2007 Berry ..................... G16H 50/80 340/521
2007/0241261 A1 * 10/2007 Wendt .................... G08B 21/16 250/221
2008/0018459 A1 * 1/2008 Derrick .................. G08B 21/22 455/456.1
2008/0036585 A1 * 2/2008 Gould ....................... G01T 7/00 340/539.2
2008/0094230 A1 * 4/2008 Mock ..................... G08B 21/22 340/539.13
2008/0111680 A1 * 5/2008 Presicci ................. G08B 25/10 340/539.22
2008/0309484 A1 * 12/2008 Francis .................. G08B 21/12 340/521
2009/0058593 A1 * 3/2009 Breed ............... B60R 21/01546 340/5.2
2009/0085873 A1 * 4/2009 Betts .................. G01N 33/0075 345/169
2009/0102622 A1 * 4/2009 Ashman .................. B60R 25/00 340/426.12
2009/0247189 A1 * 10/2009 Sennett ................... H04W 4/02 455/456.2
2010/0050259 A1 * 2/2010 Christofferson ....... H04H 20/12 726/23
2011/0037571 A1 * 2/2011 Johnson, Jr. ........... G08B 25/12 340/10.5
2011/0063116 A1 * 3/2011 Lepley ............... G01N 33/0075 340/605
2011/0163892 A1 * 7/2011 Groves ............. G01N 33/0075 340/901
2011/0183601 A1 * 7/2011 Hannon ................ H04W 48/04 455/67.11
2013/0024106 A1 * 1/2013 Kumar ................... G08B 7/066 701/423
2013/0091452 A1 * 4/2013 Sorden .................... G06F 30/20 715/771
2013/0262656 A1 * 10/2013 Cao ....................... H04L 41/142 709/224
2014/0051459 A1 * 2/2014 Gonia ................... G01S 5/0036 455/456.1
2014/0131564 A1 * 5/2014 Duraj ....................... G01V 5/06 250/361 R
2014/0274114 A1 * 9/2014 Rowitch ............... H04W 4/029 455/456.1
2014/0279210 A1 * 9/2014 Cooney .............. G06Q 30/0633 705/26.8
2014/0304402 A1 * 10/2014 Prakash .................. H04L 43/08 709/224
2015/0111524 A1 * 4/2015 South .................. G08B 25/016 455/404.2
2015/0235161 A1 * 8/2015 Azar .................. G06Q 30/0261 705/7.15
2015/0350228 A1 * 12/2015 Baxley ................ H04L 63/1483 726/23
2015/0355677 A1 * 12/2015 Breedvelt-Schouten .................... G09G 3/03 345/82
2015/0364025 A1 * 12/2015 Kirschner .............. G08B 21/12 340/539.11
2016/0187310 A1 * 6/2016 Amaravadi ............ G08B 21/14 702/24
2016/0370494 A1 * 12/2016 Zhou ......................... G01T 1/20
2017/0069192 A1 * 3/2017 Sood ................. H04M 1/72454
2017/0164151 A1 * 6/2017 Gavin ................ G08B 21/0266
2017/0185905 A1 * 6/2017 Eberbach ............... G08B 21/12
2017/0303593 A1 * 10/2017 Cameron ................ A24F 40/60
2017/0330444 A1 * 11/2017 M R .................... G08B 25/016
2017/0339741 A1 * 11/2017 K ............................ H04L 67/52
2017/0343684 A1 * 11/2017 Iwatschenko-Borho .................... G01T 1/40
2017/0374092 A1 * 12/2017 Carter ................... G06F 16/248
2018/0063807 A1 * 3/2018 Tipton ....................... G01S 5/14
2018/0068582 A1 * 3/2018 Dunlop .................. G09B 19/00
2018/0076502 A1 * 3/2018 Chretiennot .............. H01P 5/08
2018/0089976 A1 * 3/2018 Yarlagadda ............ G16H 40/67
2018/0103343 A1 * 4/2018 Vangipuram ......... H04W 4/021
2018/0157264 A1 * 6/2018 Isaacs ...................... G08G 1/00
2018/0174423 A1 * 6/2018 Trubey ............... G01N 33/0075
2018/0211345 A1 * 7/2018 Bean ....................... G01S 11/06
2018/0244292 A1 * 8/2018 Bailey ..................... B61L 23/14
2018/0289095 A1 * 10/2018 Catterson ............. A42B 3/0453
2018/0312166 A1 * 11/2018 Kerselaers ............. A61B 5/165
2018/0321214 A1 * 11/2018 Hummer ................ G08B 21/12
2018/0330594 A1 * 11/2018 Hummer .............. H04B 1/3888
2018/0349954 A1 * 12/2018 Mehta ..................... H04L 67/52
2019/0026643 A1 * 1/2019 Muijs ..................... G08B 31/00
2019/0049292 A1 * 2/2019 Poutiatine ............. G01J 1/0228
2019/0062109 A1 * 2/2019 Nanjappan ............. B66B 5/005
2019/0107566 A1 * 4/2019 Lachica ............. G01R 29/0892
2019/0156642 A1 * 5/2019 Royal ................... H04W 4/029
2019/0220678 A1 * 7/2019 Guo .......................... G06T 7/73
2020/0020330 A1 * 1/2020 Guo ..................... G01R 31/002
2020/0264146 A1 * 8/2020 Hummer ................ G01N 33/00

(56) References Cited

U.S. PATENT DOCUMENTS

2020/0265280 A1* 8/2020 Marin Palacios .................... G06K 19/06187
2020/0279469 A1* 9/2020 Giessel ................ G08B 21/182
2020/0368913 A1* 11/2020 Scott .................. G05B 23/0216
2021/0125483 A1* 4/2021 Christian ............... G08B 21/18
2021/0137483 A1* 5/2021 Pigott .................... A61B 6/547
2021/0216928 A1* 7/2021 O'Toole .................. G06F 16/29
2021/0259786 A1* 8/2021 Pigott ....................... G01T 1/02
2021/0330831 A1* 10/2021 Laty ....................... A62B 9/006
2021/0344726 A1* 11/2021 Sharifi Mehr ........ H04L 63/145
2022/0137253 A1* 5/2022 Chandrasekharan ..... G01T 3/00 250/394
2022/0207974 A1* 6/2022 Illner ..................... G06V 10/25
2022/0262522 A1* 8/2022 Goldstein .............. G16H 10/60
2022/0326202 A1* 10/2022 Berndt ..................... G01N 1/26
2022/0391484 A1* 12/2022 Weston .................. G06V 10/95
2023/0088918 A1* 3/2023 Glovinsky ........... H02H 7/1222 363/13
2023/0336696 A1* 10/2023 Chakraborty .......... H04N 7/183

* cited by examiner

THREAT DATA ANALYZER

TECHNICAL FIELD

The present disclosure relates to analyzing threat data received from detectors.

BACKGROUND

The Internet of things (IoT) is a system of interrelated computing devices, mechanical and digital machines that are provided with unique identifiers (UIDs) and the ability to transfer data over a network without requiring human-to-human or human-to-computer interaction. The definition of the IoT has evolved due to the convergence of multiple technologies, real-time analytics, machine learning, commodity sensors and embedded systems. Fields of embedded systems, wireless sensor networks, control systems, automation (including home and building automation) and others all contribute to enabling the IoT.

In some situations, certain types of emissions can be harmful to humans. For example, pulsed radio frequency (RF) emissions at particular frequencies (e.g., microwaves) may harm humans if the humans receive such pulsed RF emissions for an extended period of time. Further, exposure to radiation emissions from a source, such as enriched uranium have been shown to be harmful to humans. Further, exposure to emissions of poisonous gas are harmful to humans.

SUMMARY

One example relates to a system for monitoring operations of a computing platform. The system includes a non-transitory memory for storing machine readable instructions and a processing unit that accesses the memory and executes the machine readable instructions. The machine readable instructions include a threat analyzer that receives threat data measured by detectors. The threat data characterizes a status of detected emissions for a corresponding detector. The threat analyzer analyzes the threat data to identify a geographic region that contains a threat to humans and stores the threat data and analyzed data in a database. The machine readable instructions also include a graphical user interface (GUI) generator that provides an interactive map with indicia that characterizes the analyzed threat data.

Another example relates to a non-transitory machine readable medium having machine executable instructions executable by a processing unit. The machine executable instructions include a threat analyzer that receives threat data measured by stationary detectors and wearable detectors. The threat data characterizes a status of detected emissions for a corresponding stationary detector or a corresponding mobile detector and analyzes the threat data to identify a geographic region that contains a threat to humans. The threat analyzer stores the threat data and analyzed data in a database. The machine readable instructions also include a GUI generator that provides an interactive map with indicia that characterizes the analyzed threat data.

Yet another example relates to a method that includes receiving, at a computing platform, threat data measured by stationary detectors and mobile detectors, wherein the threat data characterizes a status of detected emissions for a corresponding stationary detector or a corresponding mobile detector. The method also includes analyzing, by the computing platform, the threat data to identify a geographic region that contains a threat to humans and to determine a signature of the threat. The method further includes storing, by the computing platform, the threat data and analyzed data in a database. Additionally, the method includes outputting, by the computing platform, a dashboard that provides an interactive map with indicia that characterizes the analyzed threat data.

DETAILED DESCRIPTION

Figure 1:
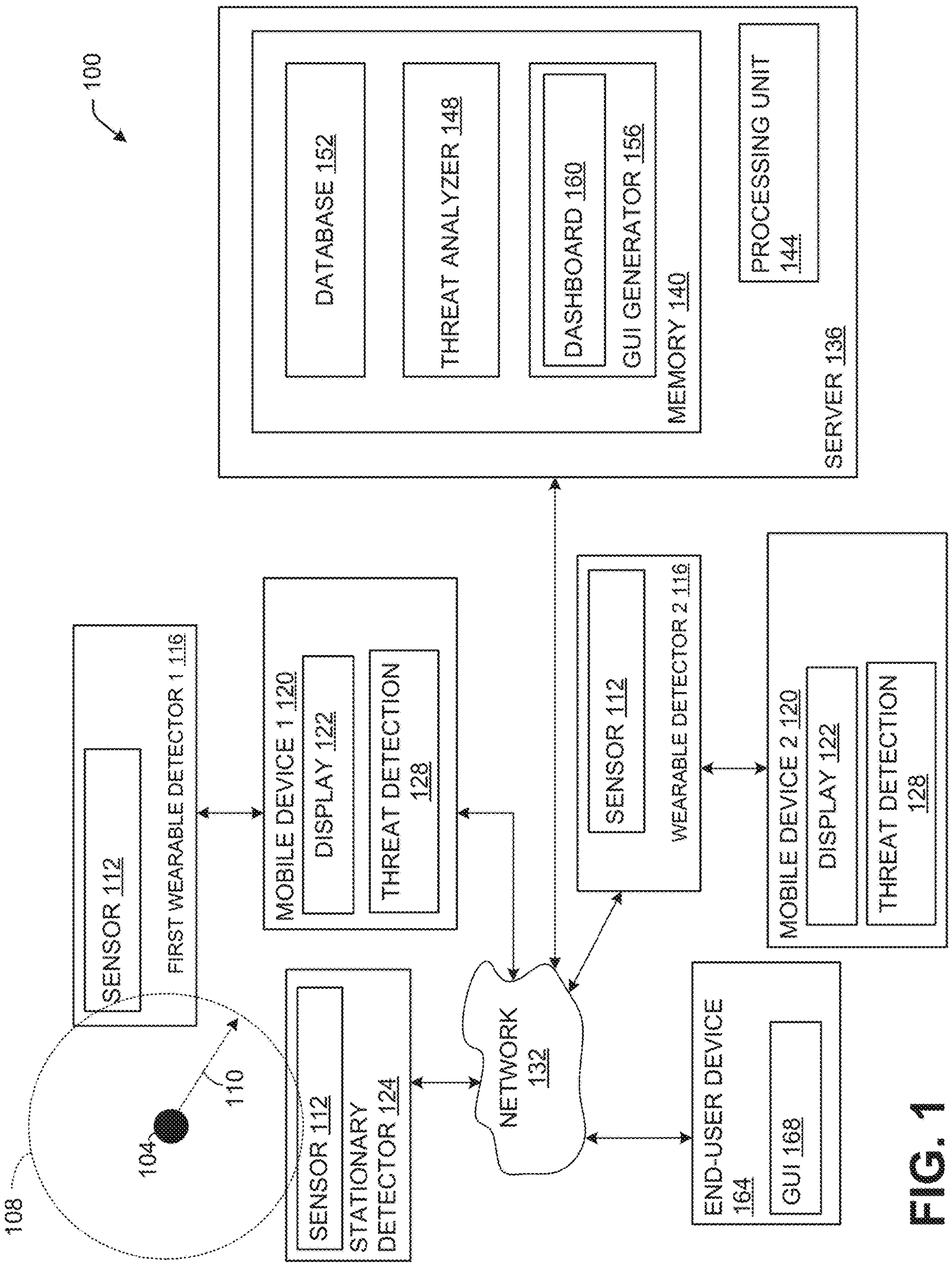
FIG. 1 illustrates a block diagram of a system for monitoring the presence or absence of a threat to humans.

This disclosure relates to systems and methods for detecting emissions that pose a threat to humans, such as microwave emissions, nuclear radiation, toxic chemicals, etc. Some of the detectors are implemented as stationary detectors, and other detectors are implemented as wearable (e.g., mobile) detectors, such that are integrated into business articles such as badge holders, lanyards, etc. In examples where the detectors are wearable detectors, the detectors communicate with an application (e.g., an app) operating on a mobile computing device (e.g., a smart phone). The application periodically and/or asynchronously pings the detector for a current state of detected emission. The application stores the pinged results along with a timestamp.

The applications executing on the mobile devices that communicate with the wearable detectors can be referred to as threat detection applications. These threat detection applications communicate with a server that executes a threat analyzer (e.g., an information management system). The threat detection applications periodically and/or asynchronously upload data characterizing the current state of detected emissions from the detectors to the server, which data can be referred to as threat data. Additionally, the stationary detectors can communicate with the information management system directly and provide similar information. In response to receipt of the data, the threat analyzer collates the data to determine if a threat is present and can store the data in a database (or other data structure). Additionally, the server provides a graphical user interface (GUI), such as a dashboard (e.g., a webpage) that includes an interactive map characterizing a current and historical status of the threat.

The interactive map provides indicia (e.g., color coded icons) that indicate a status of detectors in a particular geographic region. For instance, a green icon might indicate that the corresponding detector does not detect a threat withing a given timeframe. Conversely, a red icon might indicate that the corresponding detector has detected emissions indicative of a threat in examples where a threat is detected, each o the following (or some combination thereof) can occur; (i) increased duration and/or rate of the sampling, (ii) increased sensitivity of the dynamic range, or (iii) additional sensors brought on line within fielded device as available and/or as needed.

The threat analyzer can analyze the data characterizing detected threats to identify a signature for a particular threat. As a given example, suppose that a given threat is a microwave emitter. In this instance, the signal detected by each corresponding detector would have the same pulse width, frequency and amplitude, indicating that the signal detected by the detectors originated from the same source. This information, along with the information employ to generate the interactive map is stored in the database. Accordingly, this information is employable in forensics to determine a source of the emission and/or a time of the emissions (or a source and time of the threat, more generally). In situations where the time of the emissions is known, surveillance systems that include surveillance equipment (e.g., cameras) within the vicinity of the detectors detecting the threat can be queried to improve the chances that a source of the emissions can be identified.

FIG. 1 illustrates a block diagram of a system 100 that monitors threat data to identify a presence of a threat 104 to humans. As used herein, the term "threat" refers to emissions or exposures that can cause harm to humans. The threat 104 represents an emitter. For example, the threat 104 can represent a source of radio frequency (RF) emissions, such as pulsed emissions with a frequency of about 150 megahertz (MHz) to about 1.5 gigahertz (GHz). In other examples, the threat 104 can represent a source of radiation or a source of poisonous gas.

The threat 104 has a radius of harm 108. The radius of harm 108 represents a radial distance 110 from the threat 104. In the examples discussed, for simplicity, it is presumed that the threat 104 is omnidirectional and has such a radius of harm 108 (e.g., a circle). However, in some examples, such as RF emissions, the threat 104 can be directional and can provide emissions in a different shape.

The emissions from the threat 104 are detectable by sensors 112. The sensors 112 are designed as physical sensors to detect a particular type of threat, such as the RF emissions, radiation and/or poisonous gas. Thus, in various examples, the sensors 112 are implemented as antennas, Geiger counters or a semiconductor circuit configured to detect poisonous gas.

A first subset of the sensors 112 are integrated with a corresponding wearable detector 116 (e.g., a mobile detector). In the example illustrated, there are two wearable detectors 116, namely a first wearable detector 116 (labeled "WEARABLE DETECTOR 1") and a second wearable detector 116 (labeled "WEARABLE DETECTOR 2"). The wearable detectors 116 could be implemented, for example with a lanyard and identification card, a lapel pin, etc. The wearable detectors 116 communicate wirelessly with a corresponding mobile device 120, namely a first mobile device 120 (labeled "MOBILE DEVICE 1") and a second mobile device 120 (labeled "MOBILE DEVICE 2"). In other examples, there could be more wearable detectors 116 and more mobile devices 120. The wearable detectors 116 can be implemented, as a microcontroller, such as Internet of Things (IoT) devices, and the mobile devices 120 can be implemented as computing platforms, such as smart phones, tablet computers, etc. Thus, the corresponding wearable detectors 116 can wirelessly communicate with the corresponding mobile device 120, such as through the Bluetooth protocol.

Figure 2:
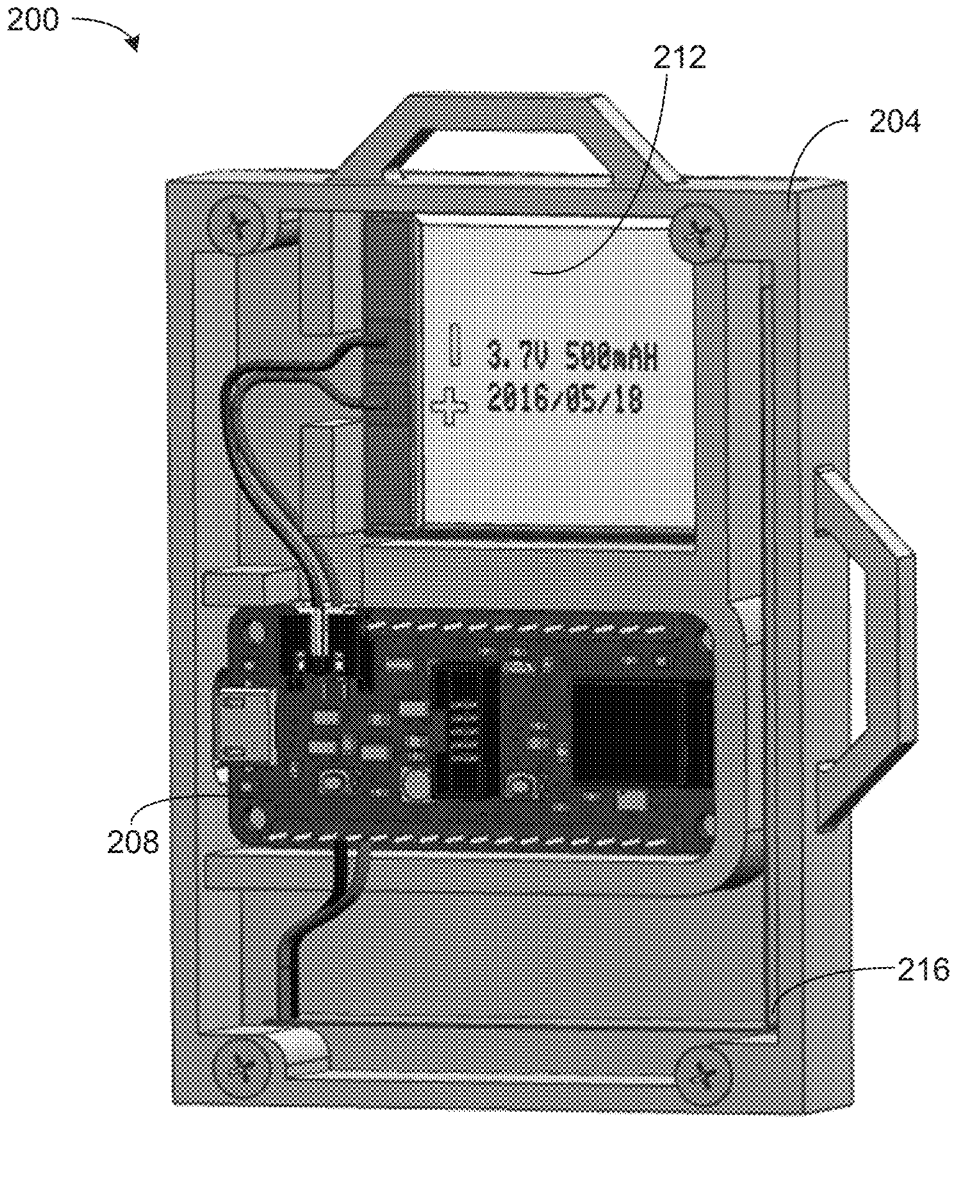
FIG. 2 illustrates a wearable detector for detecting emissions from a threat.

FIG. 2 illustrates an example of a wearable detector 200 that is employable to implement one of the wearable detectors 116 of FIG. 1. The wearable detector 200 includes a casing 204 that is shaped similar to an identification badge holder. In the example illustrated, a side of the casing 204 has been removed for visibility. The wearable detector 200 includes a microcontroller 208 (e.g., an IoT device). The wearable detector 200 includes a battery 212 (or other energy storage element) that provides power to the microcontroller 208.

In the example illustrated, the wearable detector 200 is configured to detect RF emissions. Thus, the wearable detector 200 includes an antenna 216 that implements a sensor (e.g., a sensor 112 of FIG. 1). In other examples, other types of sensors are employable in place of the antenna 216. The antenna 216 is coupled to an input port of the microcontroller 208. The microcontroller 208 includes embedded operations for communicating wirelessly with a mobile device, such as one of the mobile devices 120 of FIG. 1.

Referring back to FIG. 1, a second subset of the sensors 112 are implemented on a stationary detector 124. In the example provided, only one stationary detector 124 is illustrated, but in other examples, there could be multiple stationary detectors 124. The stationary detector 124 can be implemented with a microcontroller, such as an IoT device. In some examples, the stationary detector 124 is situated (e.g., installed) at a known permanent (or semipermanent) location.

The stationary detector 124 and the wearable detectors 116 can each be configured to periodically and/or asynchronously measure emissions and record a timestamp for the measurement, which can be referred to as threat data. In some examples, the stationary detector 124 and/or the wearable detectors 116 are configured to detect one type of emissions and/or exposure that poses a threat to humans, and in other examples, the stationary detector 124 and/or the wearable detectors 116 are configured to detect multiple types of emissions and/or exposure that pose a threat to humans. Additionally, the mobile devices 120 include a display 122, such as a touch screen display to allow user interaction. The mobile devices 120 can also execute application software (e.g., apps). More particularly, the mobile devices 120 can execute a threat detection application 128. The threat detection application 128 can be configured to periodically and/or asynchronously query (e.g., ping) the corresponding sensor 112 for the threat data. Additionally, the threat detection application 128 can query the mobile devices 120 for location data (e.g., latitude and longitudinal coordinates), which can be added to threat data.

The threat data includes data for a signature for detected emissions (if any). The signature for the emissions varies based on the type of sensor 112 employed. For instance, if the sensors 112 are implemented as antennas, such that the stationary detector 124 and the wearable detectors 116 are configured to detect RF emissions, the threat data includes a frequency and a pulse width of the RF emissions, which taken in combination can uniquely identify the threat 104.

Conversely, in examples where the sensors 112 are implemented as Geiger counters configured to detect radioactive activity, the threat data can include a time variance of detected radiation emissions.

The stationary detector 124 and the threat detection application 128 of the mobile devices 120 can communicate on a network 132. The network 132 can be implemented, for example, on a public network (e.g., the Internet), a private network (e.g., a cellular network) or a combination thereof. More particularly, the stationary detector 124 and the mobile devices 120 can communicate with a server 136 that also communicates on the network 132. The communication can be executed with a protocol that is agnostic to the particular type of sensors 112 employed.

The server 136 can be implemented as a computing platform. Thus, the server 136 can include non-transitory memory 140 (e.g., a computer readable medium) that can store machine readable instructions and data. The non-transitory machine readable memory 140 can be implemented, for example, as volatile or nonvolatile random access memory (RAM), such as flash memory, a hard-disk drive, a solid state drive or a combination thereof. The processing unit 144 (e.g., one or more processor cores) can access the memory 140 and execute the machine-readable instructions.

The server 136 could be implemented in a computing cloud. In such a situation, features of the server 136, such as the processing unit 144, a network interface to communicate on the network 132, and the memory 140 could be representative of a single instance of hardware or multiple instances of hardware with applications executing across the multiple of instances (i.e., distributed) of hardware (e.g., computers, routers, memory, processors, or a combination thereof). Alternatively, the server 136 could be implemented on a single dedicated server.

The memory 140 can include a threat analyzer 148 that communicates with a database 152 and graphical user interface (GUI) generator 156. The stationary detector 124 and the threat detection applications 128 operating on the mobile devices 120 can provide threat data to the threat analyzer 148. The threat analyzer 148 stores the threat data in the database 152. Additionally, the threat analyzer 148 controls the GUI generator 156 causing the GUI generator 156 to provide a dashboard 160 (e.g., a webpage) that is accessible by an end-user device 164.

The end-user device 164 is implemented as a computing platform, such as a desktop computer, a laptop computer, a server, a tablet computer, a smartphone, etc. The end-user device 164 includes a GUI 168 (e.g., a web browser) that allows for user interaction. Additionally, although the end-user device 164 and the mobile devices 120 are illustrated as being separate devices, in some examples, the end-user device 164 and the mobile devices 120 (that communicates with a wearable detector 116) can be integrated on a single device. More particularly, the GUI 168 can display the dashboard 160 generated by the GUI generator 156, and allow a user of the end-user device 164 to interact with the dashboard (e.g., press virtual buttons, enter user input, etc.).

The threat analyzer 148 monitors the threat data to determine if an active threat is detected. In situations where the threat data from the stationary detector 124 and the wearable detectors 116 indicate that no emissions (or emissions below a threshold) are detected, the threat analyzer 148 can determine that no current threat is being detected. In some examples, there are hundreds or thousands of wearable detectors 116 and/or stationary detectors 124 geographically distributed throughout the earth (e.g., at working facilities). Thus, in situations where no threat is detected, it is presumed that none of the geographically distributed wearable detectors 116 or the stationary detector 124 are detecting emissions that would be indicative of a threat. In this situation, the threat analyzer 148 provides the GUI generator 156 with data indicating that no threat is detected, and the dashboard 160 provides information to the user of the end-user device 164 indicating as such. Furthermore, in situations where no threat is detected, the threat detection application 128 of the mobile devices 120 and the stationary detector 124 can record sensed emissions at a first measurement sensitivity level to conserve battery life of the wearable devices 116 and the mobile devices 120.

In converse to a situation where no threat is detected in the example illustrated, the sensor 112 of the first wearable detector 116 and the sensor 112 of the stationary detector 124 are shown as being located within the radius of harm 108 of the threat 104. Thus, in the example illustrated, the threat data provided by the first mobile device 120 and the stationary detector 124 include data characterizing the signature of the threat 104. Additionally, in the example illustrated, the sensor 112 of the second wearable detector 116 does not detect the threat 104 because the second wearable detector 116 is outside the radius of harm 108 of the threat 104.

Thus, in the illustrated example, the threat data from the first mobile devices 120 and the stationary detector 124 indicates that emissions are detected, and includes a signature characterizing the emissions. In response, the threat analyzer 148 can store the threat data (including a location of the first mobile device 120 and the stationary detector 124) in the database 152. Additionally, the threat detection application 128 of the first mobile device 120 and the stationary detector 124 can increase the measurement sensitivity level of recording detected emissions from a first level to a second level improve a resolution (e.g., timeliness and/or accuracy) of the threat data.

Figures 3A, 3B, 3C:
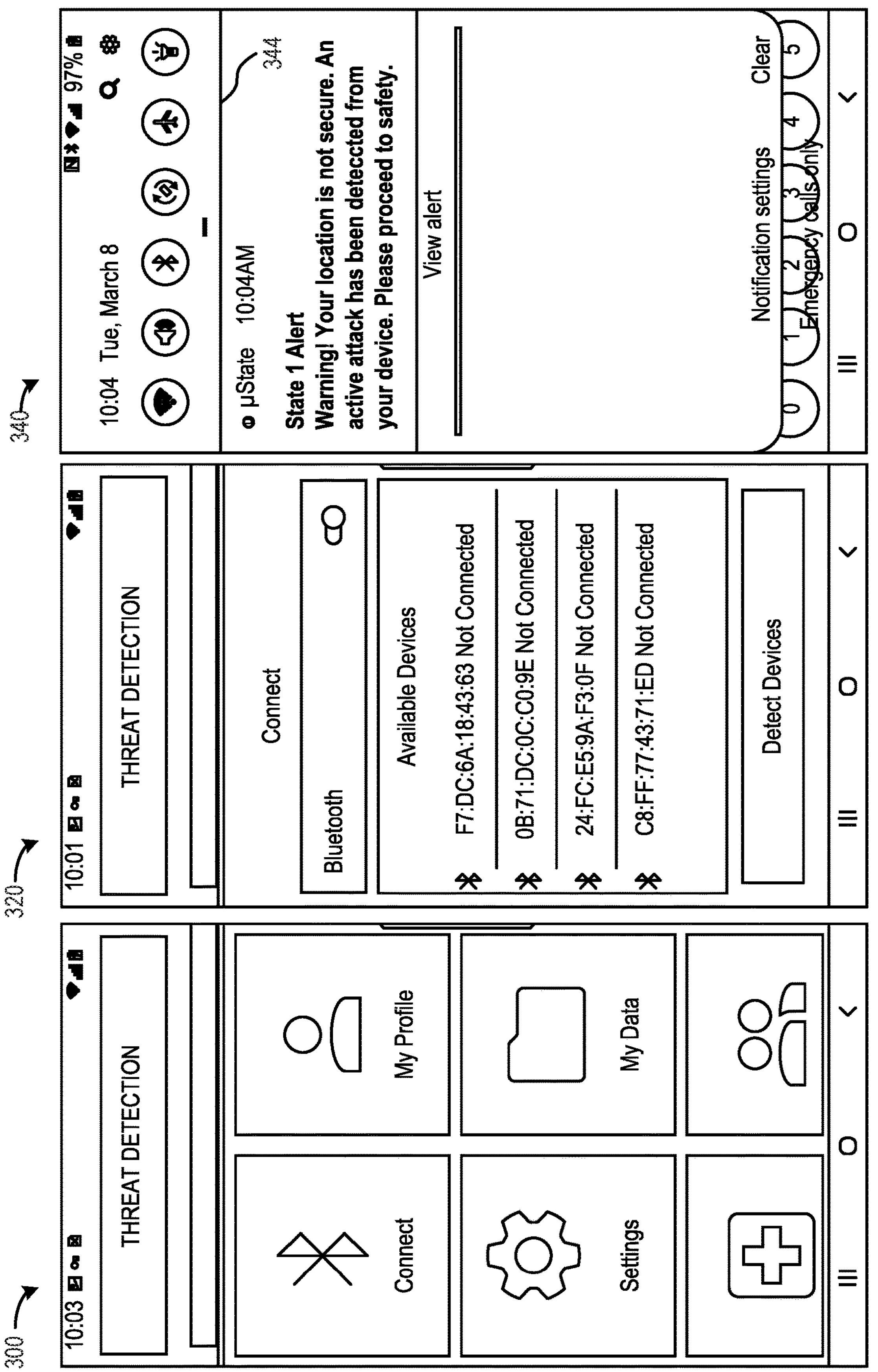
FIG. 3A illustrates a first screenshot for a threat detection application executing on a mobile device.
FIG. 3B illustrates a second screenshot for a threat detection application executing on a mobile device.
FIG. 3C illustrates a third screenshot for a threat detection application executing on a mobile device.

Additionally, the threat analyzer 148 can provide a notification to the threat detection application 128 of the first mobile device 120 that the threat 104 has been detected. In response, the threat detection application 128 of the first mobile device 120 outputs a notification on the display 122. FIGS. 3A-3C illustrate example screenshots output by the threat detection application 128.

More specifically, FIG. 3A illustrates a first screenshot 300 of a threat detection application (e.g., the threat detection application 128 of FIG. 1) executed by a mobile device (e.g., the first mobile device 120 of FIG. 1) showing a dashboard with selectable operations (e.g., virtual buttons). FIG. 3B illustrates a second screenshot 320 of the threat detection application that lists wearable detectors (e.g., the wearable detectors 116 of FIG. 1) that are communicating with the mobile device executing the threat detection application. FIG. 3C illustrates a third screenshot 340 of the threat detection application that provides a notification 344 with text explaining that a threat (e.g., the threat 104 of FIG. 1) was detected by the corresponding wearable detector (e.g., the first wearable detector 116).

Referring back to FIG. 1, additionally, in response to the threat data indicating that a threat has been detected, the threat analyzer 148 also identifies a subset of wearable detectors 116 and/or stationary detectors 124 that are proximate to the first wearable detector 116 and/or the stationary detector 124, or to any other wearable detectors 116 and/or stationary detector 124 that detected emissions indicative of a threat. The proximate distance varies in range based on the type of threat 104, such that the proximate distance can be 10 meters or less in some examples, and in other examples, the proximate distance can be one kilometer or more. This subset of wearable detectors 116 and/or stationary detectors 124 is provided a notification indicating that a threat has been detected in the proximate area. In response to this notification, the receiving threat detection application 128 increases a measurement sensitivity level for the wearable detectors 116 from a first level to a second level. In a similar manner, the stationary detector 124 increases its measurement sensitivity level.

Increasing the measurement sensitivity level of the subset of wearable detectors 116 and/or stationary detectors 124 increases an accuracy of the measurements taken. In a first example, suppose that the threat 104 is an RF emitter. In this first example, increasing the measurement sensitivity level (e.g., sensitivity of a dynamic range) from the first level to the second level causes the threat detection application 128 or the stationary detector 124 to increase a measurement rate (alternatively referred to as a ping rate) of the sensors 112 from the first rate (a first level; e.g., once per second to once per 10 minutes) to a second rate (a second level; e.g., a rate greater than the first rate) to improve a resolution (e.g., timely accuracy) of the threat data. In a second example, suppose that the threat 104 is a source of poisonous gas. In this second example, the first level of the measurement sensitivity could cause the sensors 112 of the subset of wearable detectors 116 and/or stationary detectors 124 to report a detection of any poisonous gas. In a second level of the measurement sensitivity in the second example, the subset of wearable detectors 116 and/or stationary detectors 124 can cause the sensors 112 to measure and report detection of specific types of poisonous gas. In a third example, suppose that the threat 104 is a source of radiation emissions. In this second example, the first level of measurement sensitivity could cause the sensors 112 of the subset of wearable detectors 116 and/or stationary detectors 124 to measure any type of detected radiation. In a second level of measurement sensitivity in the second example, the subset of wearable detectors 116 and/or stationary detectors 124 can cause the sensors 112 to measure and report specific types of radiation, such as alpha, beta and gamma particles. In other examples, other types of operations can be changed to increase the measurement sensitivity level. Additionally, the threat detection application 128 causes the corresponding display 122 to output a warning that a proximal threat (e.g., the threat 104 has been detected). In a first example, the threat detection application 128 of the second mobile device 120 receives the notification. In a second example, the second mobile device 120 is presumed not to be proximate to the first wearable detector 116 and/or the stationary detector 124, such that the threat analyzer 148 does not provide the threat detection application 128 of the second mobile device 120 with the notification, and the operations of the threat detection application 128 of the second mobile device 120 would be unchanged.

At some point in the future, the threat 104 is ceased, and the threat data from the wearable detectors 116 and/or the stationary detector 124 no longer indicates that a threat is detected. In this situation, the threat analyzer 148 provides an indication to the threat detection application 128 of the mobile devices 120 that no threats are detected, and that the measurement sensitivity level can be reduced to the first level to conserve battery life of the wearable detectors 116 and the mobile devices 120.

As noted, the dashboard 160 generated by the GUI generator 156 is accessible by the end-user device 164 (e.g., through a web browser). The dashboard 160 provides a real-time status (e.g., within 10 minutes) of the presence or absence of any threat detected, including the threat 104. FIGS. 4A-4F illustrate a sequence of webpages for the dashboard 160 that could be provided, for example, in response to detecting a threat or multiple threats.

Figure 4A:
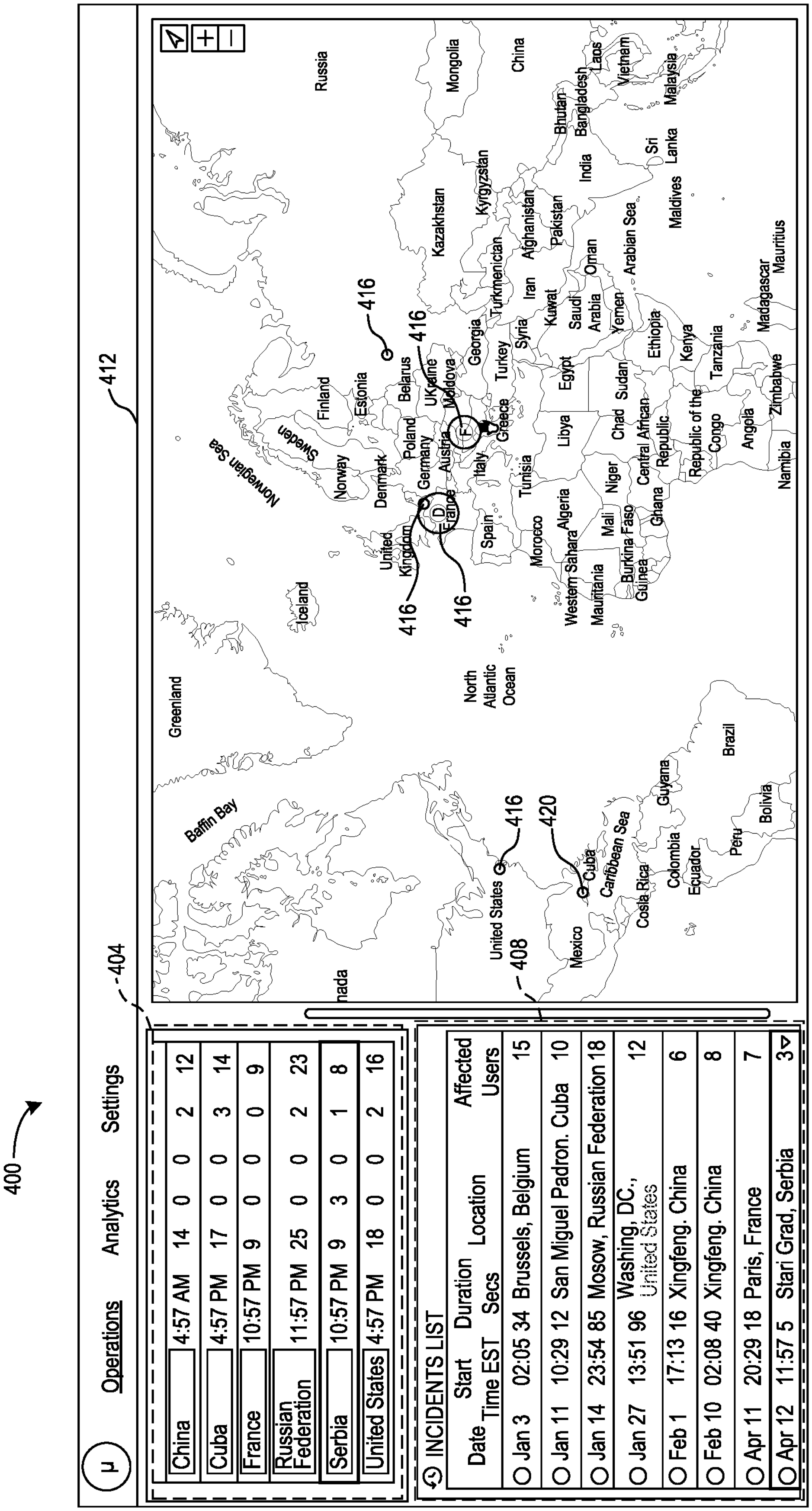
FIG. 4A illustrates a first screenshot of a dashboard generated by a graphical user interface (GUI) generator.

FIG. 4A illustrates a first screenshot 400 of a dashboard (e.g., the dashboard 160 of FIG. 1) that could be output by an end-user device (e.g., the end-user device 164 of FIG. 1). The first screenshot includes a location summary 404. The location summary 404 includes a list of locations and a current status of wearable detectors (e.g., the wearable detectors 116 of FIG. 1) at or around each such location. The status includes a battery level and an indicia (e.g., an icon) indicating a number of wearable detectors in each area that detect a threat and the number of wearable detectors that do not detect a threat.

In the example location summary 404 provided, it is shown that a threat is detected by 3 wearable detectors near Serbia, and 9 wearable detectors or stationary detectors at or near Serbia do not detect a threat. Thus, in the example illustrated, a threat analyzer (e.g., the threat analyzer 148 of FIG. 1) notifies a threat detection application (e.g., the threat detection application 128 of FIG. 1) operating on the corresponding mobile device (e.g., one of the mobile devices 120 of FIG. 1) that the corresponding wearable detector detected a threat (e.g., the threat 104 of FIG. 1) and that a sensitivity level of measurement of the emissions is to be increased from a first level to a second level. Additionally, the threat analyzer notifies the mobile devices corresponding to the 9 wearable detectors and/or stationary detectors proximate to Serbia that are not reporting detection of the threat that a threat has in fact been detected, and that a sensitivity level of the measurements of the emissions is to be increased from the first level to the second level.

Additionally, the first screenshot 400 includes an incident list 408 that characterizes recently recorded threats based on data stored in a database (e.g., the database 152 of FIG. 1) that are within the field of view of a map 404. The incident list 408 includes a start time of the threat, a duration of the detected threat and a number of affected users during the corresponding threat.

Further, the first screenshot 400 includes the map 412 that includes icons indicating a status of wearable detectors in a given area. In the example illustrated, icons 416 with a first color (e.g., green) are provided. Additionally, icons 420 with a second color (e.g., red) and/or other indicia (e.g., expanded, flashing, etc.) are indicative of a region where a threat is currently being detected. In the example illustrated, one icon 420 is situated near Serbia, the location indicated in the location summary 404 for which a current threat is detected. Additionally, another icon 420 near France indicates that a threat has recently been detected, as indicated by the incident list 408.

Figure 4B:
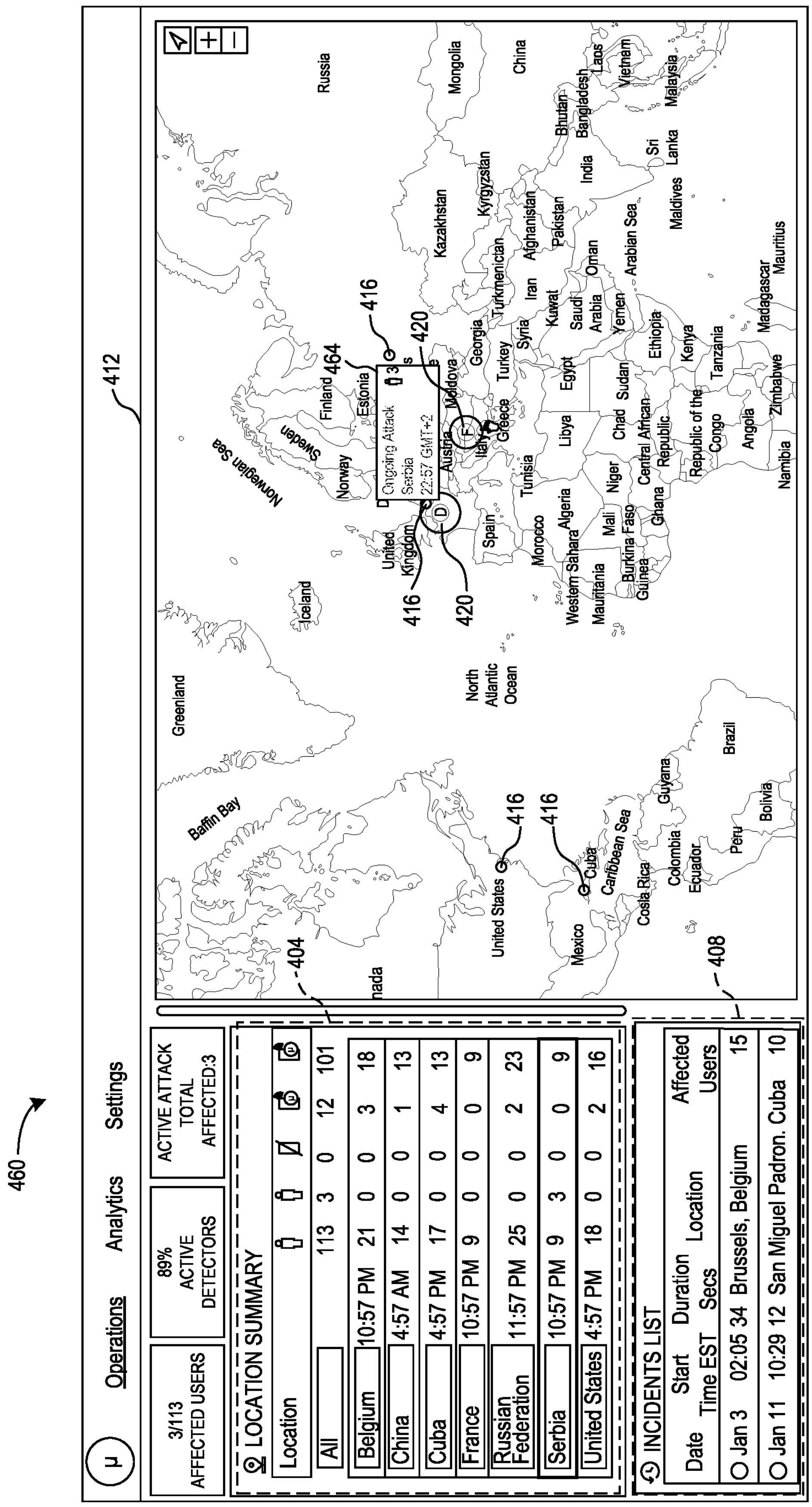
FIG. 4B illustrates a second screenshot of the dashboard generated by a graphical GUI generator.

FIG. 4B illustrates a second screenshot 460 wherein a user has hovered over the icon 420 near Serbia on the map 412 using a virtual cursor (e.g., a mouse or finger on a touch screen). In response to the hovering, a small window 464 displays additional details about the current threat, including a start time of the current threat and a number of wearable detectors that detected the threat.

Figure 4C:
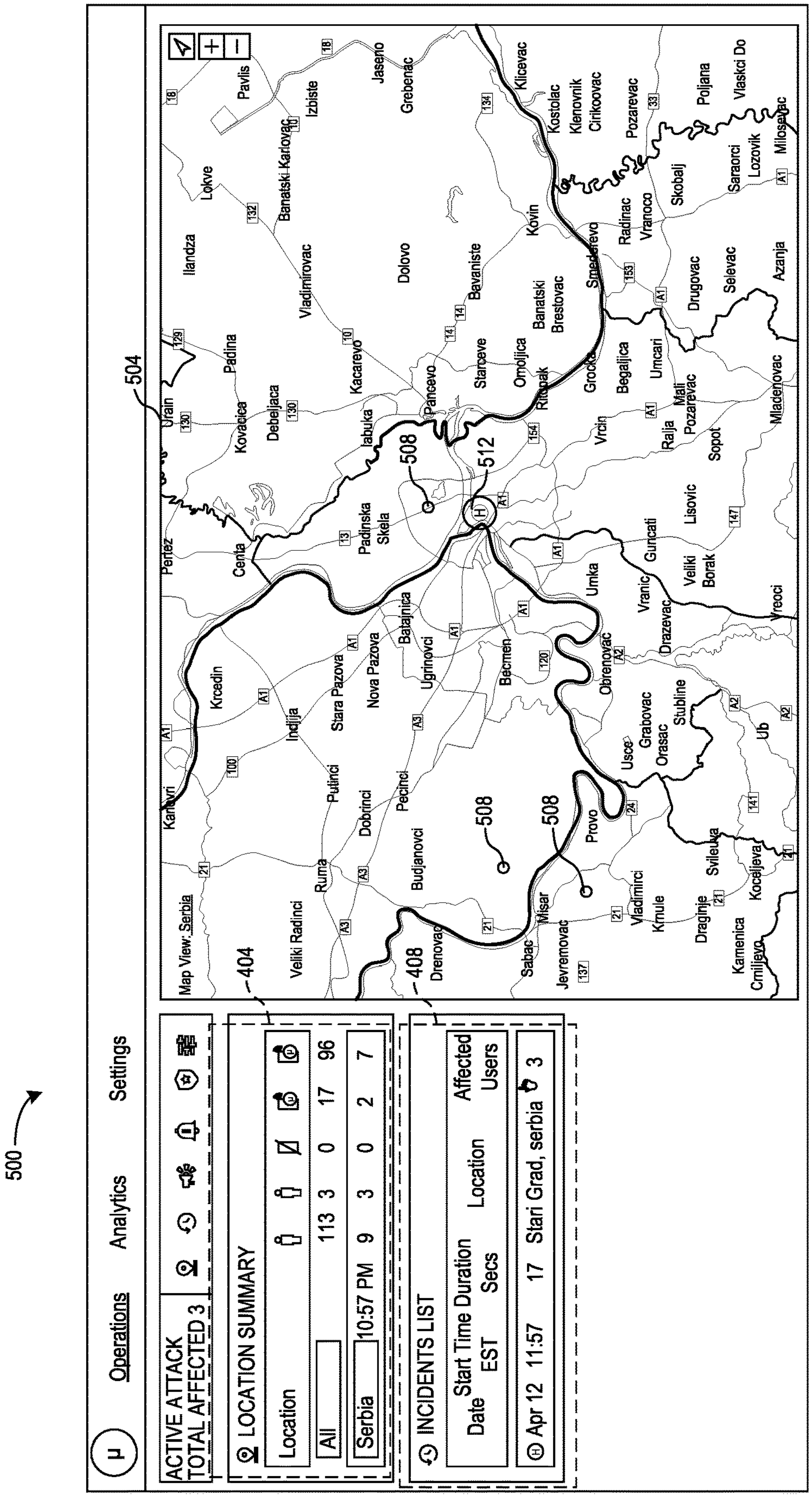
FIG. 4C illustrates a third screenshot of the dashboard generated by a graphical GUI generator.

FIG. 4C illustrates a third screenshot 500 wherein the icon 420 near Serbia in the screenshot 460 has been selected and actuated (e.g., clicked or virtually pressed). In the third screenshot 500 a smaller (by geographic region) map 504 is displayed that includes only a geographic area of Serbia (rather than multiple continents). The map 504 also includes additional icons 508 of the first color (e.g., green) and an icon 512 of the second color (e.g., red). The icons 508 of the first color correspond to regions within the map 504 where no threat is detected, and the icon 512 of the second color identifies a region within the map 504 where a threat is detected.

Figure 4D:
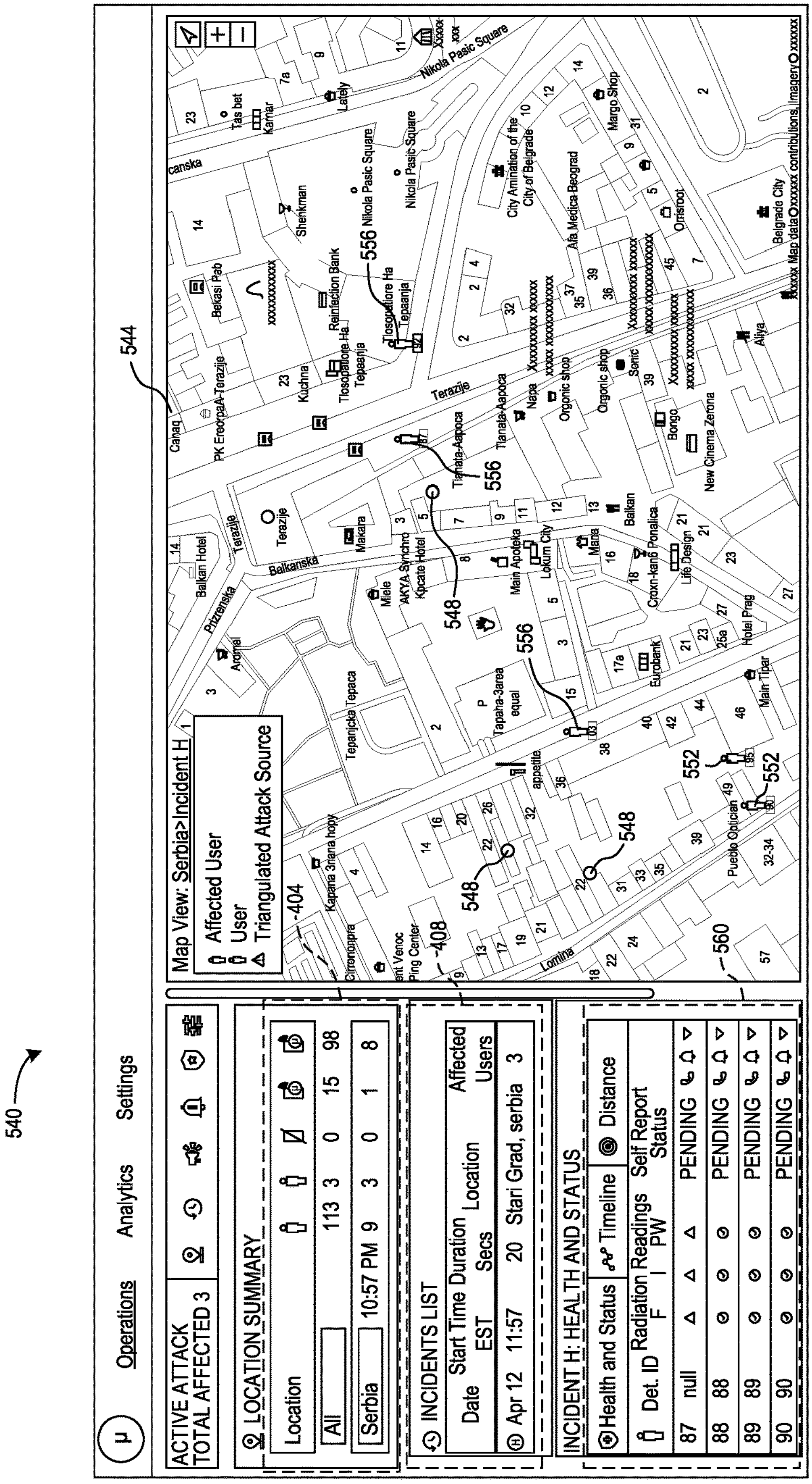
FIG. 4D illustrates a fourth screenshot of the dashboard generated by a graphical GUI generator.

FIG. 4D illustrates a fourth screenshot 540 where the icon 512 of FIG. 4C has been selected. The fourth screenshot 540 includes a map 544. The map 544 is a street-level map covering a relatively small geographic area. The map 544 includes icons 548 of the first color (e.g., green) that represent individual stationary detectors (e.g., and instance of the stationary detector 124 of FIG. 1) for which no threat is detected. The map 544 also includes icons 552 of the first color that represent individual wearable detectors (e.g., one of the wearable detectors 116 of FIG. 1). Further, the map 544 includes icons 556 of the second color (e.g., red) that represent individual wearable detectors for which a threat has been detected (e.g., through threat data). In response to detecting the threat, the threat detection applications associated with the detectors corresponding to the icons 552 and the icons 556 are provided a warning that a threat has been detected in a proximate area, and that a measurement sensitivity level is increased from the first level to the second level.

The fourth screenshot 540 also includes a health and status category 560 of a menu that provides user specific information about individual wearers of wearable detectors. The health and status category 560 includes information characterizing a reported health status of the individual wearers and an icon (e.g., an icon of a telephone) for contacting the individual wearers.

Figure 4E:
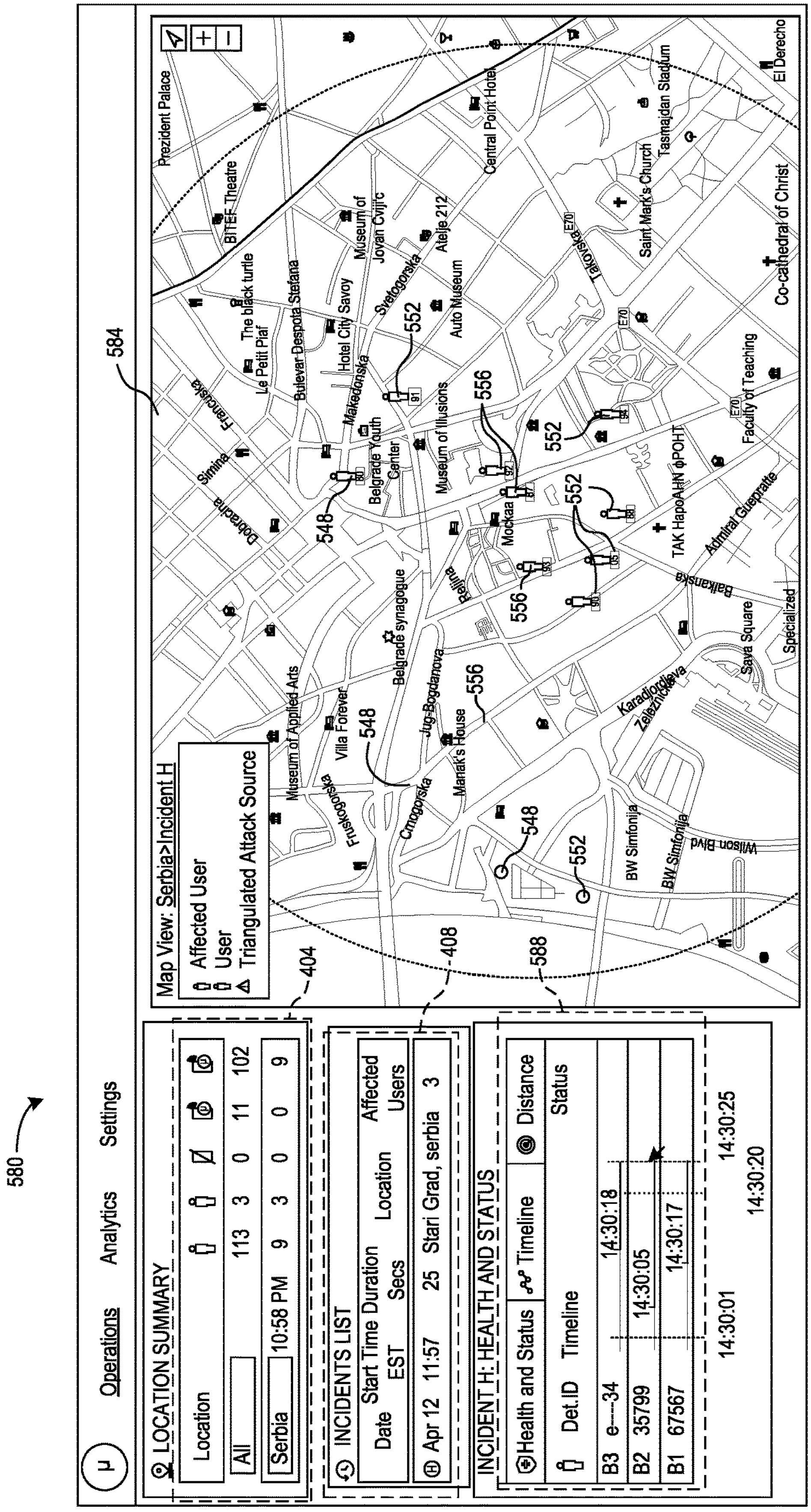
FIG. 4E illustrates a fifth screenshot of the dashboard generated by a graphical GUI generator.

FIG. 4E illustrates a fifth screenshot 580 with a map 584 (e.g., a street level map) wherein a timeline category 588 of a menu is selected. The timeline category 588 gives information characterizing the timeline for when individual wearable detectors or stationary detectors detected emissions from a threat and also show (if available) a time when the wearable detectors stopped detecting emissions from the threat.

Figure 4F:
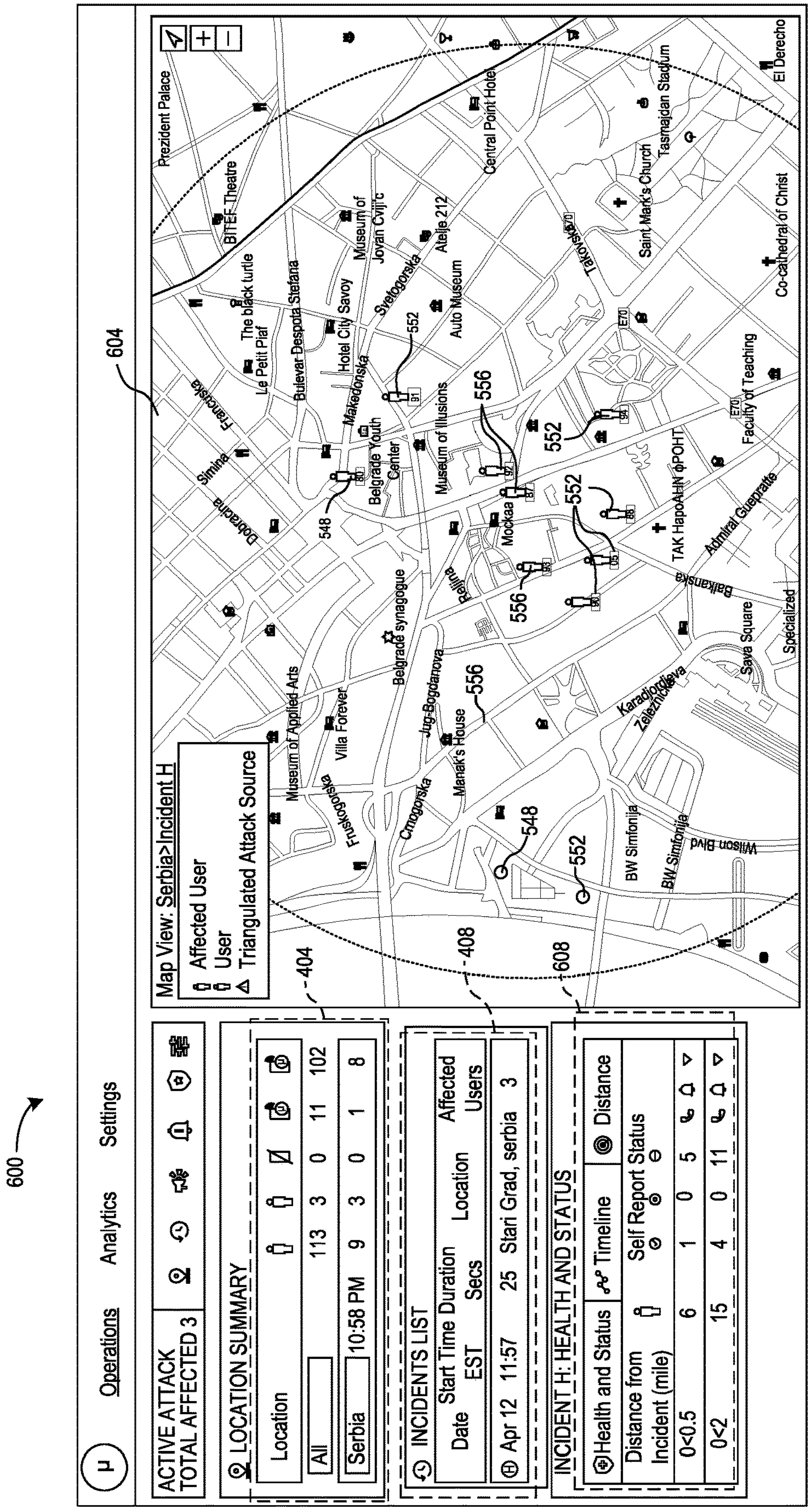
FIG. 4F illustrates a fifth screenshot of the dashboard generated by a graphical GUI generator.

FIG. 4F illustrates a sixth screenshot 600 with a map 604 (e.g., another street level map), wherein a distance category 608 of a menu is selected. The distance category 608 gives a distance from a wearable detector that has detected a threat.

Referring back to FIG. 1, as demonstrated by FIGS. 4A-4F, real-time (e.g., within 10 minutes) information characterizing a current status of a detected threat can be accessed by a user of the end-user device 164. Moreover, in some examples, the dashboard 160 and the threat analyzer 148 can be employed to extract historical information from the database 152 that is employable in forensics to identify the threat 104 (e.g., identify a source and location of the threat 104), and the threat analyzer 148 can query the database 152 to identify previous (historical threats) that have the same signature. For instance, in situations where 3 or more detectors (e.g., wearable detectors 116 and/or stationary detectors 124) detect a threat, the threat analyzer 148 can employ triangulation to determine a location of the threat 104. Furthermore, because the threat data is timestamped and includes a signature of the threat 104, during a forensics investigation, video footage captured by cameras (e.g., cameras of surveillance systems) in the vicinity of the wearable detectors 116 and/or the stationary detector 124 can be examined to reveal the location and the identity of the threat 104. For instance, suppose that the threat 104 has a unique signature, and the video recorded by cameras of a surveillance system near a detected threat reveal that a specific automobile (e.g., a van) is present in the vicinity each time the same signature of the threat 104 is detected. In this instance, there is an increased likelihood that the threat 104 is located within this vehicle.

Accordingly, by implementing the system 100, the location and identify of the threat 104 may be able to be determined. The system 100 enables constant monitoring of emissions of the threat 104 that are employable to detect the presence or the absence of the threat at a particular time. Furthermore, the communication protocol between the threat detection application 128 and the threat analyzer 148 is agnostic to a particular type of threat. Stated differently, the threat detection application 128 and the threat analyzer 148 are easily modified to accommodate a variety of threats, including the aforementioned RF emissions, radiation emissions, poisonous gas and/or any future detectable emissions and/or exposures from potential threats. Accordingly, the system 100 enables authorities to identify the location and source of the threat 104 both in real-time (e.g., while the threat is occurring) and/or forensically through the use of historical data stored in the database 152 such as the timestamp and/or signature of the threat 104.

Figure 5:
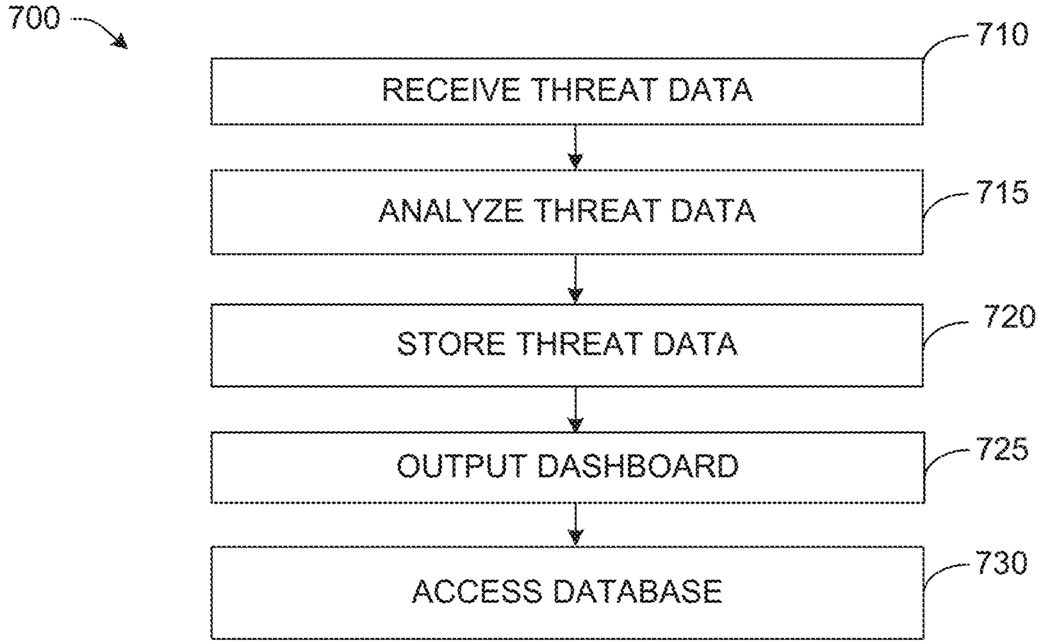
FIG. 5 illustrates an example of a method for monitoring for the presence or absence of a threat.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flowchart of an example method 700 for monitoring the presence and/or absence of a threat from emission that could cause harm to humans. The method 700 could be executed, for example, by a server (e.g., a computing platform), such as the server 136 of FIG. 1.

At 710, the server receives threat data measured by stationary detectors and wearable detectors. The threat data characterizes a status of detected emissions and/or exposures for a corresponding stationary detector (e.g., a stationary detector 124 of FIG. 1) or a corresponding wearable detector (e.g., a wearable detector 116 of FIG. 1). At 715, the server analyzes the threat data to identify a geographic region that contains a given threat and to determine a signature of the threat to humans. At 720, the server stores the threat data and analyzed data in a database. At 725, the server outputs a dashboard (e.g., a webpage) that provides an interactive map with indicia that characterizes the analyzed threat data.

At 730, the server accesses the database to identify other threats with the same signature as the given threat. For instance, suppose that the given threat represents RF emissions with a particular frequency and pulse width. In such a situation, the signature of the threat could include the frequency and pulse width of the RF emissions. Thus, the server can retrieve historical threat data that reveals a time and location and associated with threat that have the same (or nearly the same) signature, and such information may be employed, for example, in a forensics analysis to identify a location and a source of the threat.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for monitoring operations of a computing platform comprising:

a non-transitory memory for storing machine readable instructions; and a processing unit that accesses the memory and executes the machine readable instructions, the machine readable instructions comprising:

a threat analyzer that:

periodically and/or asynchronously receives threat data from the mobile computing devices, the threat data measured by wearable detectors communicating with mobile computing devices, wherein the threat data includes a measurement of detected emissions and a timestamp for the measurement, for a corresponding wearable detector;

monitors the measurement of the detected emissions included in the threat data to determine a threat;

analyzes the threat data to identify a geographic region that contains the threat to humans and determines a signature of the threat based on the threat data;

stores the signature of the threat, the threat data, and analyzed data in a database; and identifies a source of the threat by identifying historical threats from the database that have a same signature as the threat based on a forensics analysis and triangulates a location of the threat based on the threat data measured by three or more of the wearable detectors and location data provided by the mobile computing devices; and a graphical user interface (GUI) generator that provides an interactive map with indicia includes icons, each representing the location and a status of the three or more wearable detectors in the geographic region that provided the threat data, that characterizes the analyzed threat data;

wherein in response to detecting the threat, the threat analyzer further:

identifies a subset of the wearable detectors proximate to the threat; and increases a measurement sensitivity level for the subset of the wearable detectors from a first level to a second level.

2. The system of claim 1, wherein the threat corresponds to a radio frequency (RF) emitter that provides a pulsed RF signal at a selected frequency.

3. The system of claim 2, wherein the selected frequency is between about 150 megahertz (MHz) and about 1.5 gigahertz (GHz).

4. The system of claim 2, wherein determining the signature of the threat includes identifying a pulse width and the selected frequency of the threat.

5. The system of claim 1, wherein the threat corresponds to a radioactive source or toxic chemical emitter.

6. The system of claim 1, wherein the interactive map is provided as a webpage.

7. The system of claim 1, wherein the wearable detectors are distributed in multiple continents of earth.

8. A non-transitory machine readable medium having machine executable instructions executable by a processing unit, the machine executable instructions comprising:

a threat analyzer that:

periodically and/or asynchronously receives threat data from the mobile computing devices, the threat data measured by stationary detectors and wearable detectors communicating with mobile computing devices, wherein the threat data includes a measurement of detected emissions and a timestamp for the measurement, for a corresponding stationary detector or a corresponding wearable detector;

monitors the measurement of the detected emissions included in the threat data to determine a threat;

analyzes the threat data to identify a geographic region that contains the threat to humans and determines a signature of the threat based on the threat data;

stores the signature of the threat, the threat data, and analyzed data in a database; and identifies a source of the threat by identifying historical threats from the database that have a same signature as the threat based on a forensics analysis and triangulates a location of the threat based on the threat data measured by three or more of the wearable detectors and location data provided by the mobile computing devices; and a graphical user interface (GUI) generator that provides an interactive map with indicia includes icons, each representing a location and a status of the three or more wearable detectors and/or the stationary detectors in the geographic area that provided the threat data, that characterizes the analyzed threat data;

wherein in response to detecting the threat, the threat analyzer further:

identifies a subset of the stationary detectors and/or the wearable detectors proximate to the threat; and increases a measurement sensitivity level for the subset of the stationary detectors and/or the wearable detectors from a first level to a second level.

9. The medium of claim 8, wherein the threat corresponds to a source of radio frequency (RF) emissions that provides a pulsed RF signal at a selected frequency.

10. The medium of claim 9, wherein the determining the signature of the threat includes identifying a pulse width and the selected frequency of the threat.

11. A method comprising:

periodically and/or asynchronously receiving, at a computing platform, threat data measured by stationary detectors and mobile detectors communicating with mobile computing devices, wherein the threat data includes a measurement of detected emissions and a timestamp for the measurement, for a corresponding stationary detector or a corresponding mobile detector;

monitoring, by the computing platform, the measurement of the detected emissions included in the threat data to determine a threat;

analyzing, by the computing platform, the threat data to identify a geographic region that contains the threat to humans and to determine a signature of the threat;

storing, by the computing platform, the signature of the threat, the threat data, and analyzed data in a database;

identifying, by the computing platform, a source of the threat by identifying historical threats from the database that have a same signature as the threat based on a forensics analysis and triangulates a location of the threat based on the threat data measured by three or more of the wearable detectors and location data provided by the mobile computing devices; and outputting, by the computing platform, a dashboard that provides an interactive map with indicia includes icons, each representing a location and a status of the three or more mobile detectors or the stationary detector in the geographic area that provided the threat data, that characterizes the analyzed threat data, wherein in response to detecting the threat, the computing platform further:

identifies a subset of the stationary detectors and the mobile detectors proximate to the threat; and increases a measurement sensitivity level for the subset of the stationary detectors and the mobile detectors from a first level to a second level.

12. The method of claim 11, wherein the threat is a pulsed radio frequency (RF) signal at a selected frequency.

* * * * *